Patented May 8, 1945

2,375,315

UNITED STATES PATENT OFFICE 2,375,315

INTERFACE MODIFIER

Lawson W. Mixon, Hammond, Ind., assignor to Standard Oil Company, Chicago, Ill., a corporation of Indiana No Drawing. Application November 28, 1941,
Serial No. 420,863

14 Claims. (Cl. 252—352)

The present invention relates to new products adapted for use as detergent aids and as wetting, dispersing, emulsifying, and penetrating agents in general, and particularly for use in combination with mineral oils as slushing or rust preventing oils, soluble oils, cutting oils, textile lubricants, and the like. Furthermore the invention relates to a method of modifying the interface of a system of which at least one component is a liquid.

It is an object of the present invention to provide an improved wetting agent and/or detergent agent of high wetting and detergency effectiveness. Another object of the invention is to provide improved products which promote the spreading of surface coatings, increase the spreading and penetrating power of liquids such as aqueous solutions and oils, and which are adapted for use in rust preventives, soluble oils, cutting oils, textile oils, and the like. Other objects and advantages of the invention will become apparent as the description thereof proceeds.

In accordance with the present invention the foregoing objects are achieved by employing the product obtained by neutralizing or partially neutralizing the reaction product of a phosphorus sulfide and an olefin hydrocarbon or an olefin hydrocarbon polymer, preferably a mono-olefin hydrocarbon or a mono-olefin hydrocarbon polymer, particularly those having high molecular weights and/or long carbon chains. The reaction product of a phosphorus sulfide and an olefin hydrocarbon or an olefin hydrocarbon polymer normally shows a titratable acidity ranging from about 10 milligrams to about 50 milligrams of KOH per gram of product. In accordance with the present invention this acidic product is treated with an alkaline material, hereinafter described, to effect the neutralization of at least about 1% of this titratable acidity. When the neutralization is accomplished with a polyvalent basic metal such as lime, a product having excess basicity may be obtained.

The neutralization of the phosphorus sulfide-olefin or olefin polymer reaction product may be effected by adding to the reaction product a suitable alkaline compound such as a hydroxide, a carbonate or an oxide of an alkali or alkaline earth metal, preferably sodium or potassium hydroxide. Ammonia or alkyl or aryl substituted ammonia such as amines may be used. A neutralized product containing a very heavy metal constituent such as, for example, tin, titanium, aluminum, chromium, cobalt, iron and the like, may be obtained by treating the neutralized product with a salt of the desired heavy metal.

The term "neutralized phosphorus sulfide-olefin or olefin polymer reaction product" as used herein means a phosphorus sulfide-olefin or olefin polymer reaction product having at least about 1% of its titratable acidity reduced by the reaction with a basic reagent, and includes the neutralized phosphorus sulfide-olefin or olefin polymer reaction products containing a metal constituent resulting from said neutralization or resulting from the reaction of a heavy metal salt with the phosphorus sulfide-olefin or olefin polymer reaction product treated with a basic reagent. The final product is characterized by the presence or retention of the metal constituent of the neutralizing reagent.

The mono-olefin polymer to be treated may be the polymer resulting from the polymerization of low molecular weight mono-olefins, preferably the iso-mono-olefins, such as isobutylene and isoamylene and/or the co-polymers obtained by the polymerization of hydrocarbon mixtures containing iso-mono-olefins and mono-olefins of less than six carbon atoms and preferably those of four carbon atoms. The polymer may be obtained by the polymerization of these olefins or mixed olefins in the presence of catalysts such as sulfuric acid, phosphoric acid, or boron fluoride, aluminum chloride or other similar halide catalyst of the Friedel-Crafts type.

The polymers employed are preferably mono-olefin polymers, in which the molecular weight ranges from about 150 to about 50,000 or more, and preferably from about 500 to about 10,000. These polymers can be obtained, for example, by the polymerization in the liquid phase of an iso-olefin, such as isobutylene, or hydrocarbon mixtures containing the same at a temperature of from about $-80°$ F. to about $100°$ F. in the presence of a metal halide catalyst of the Friedel-Crafts type, such as boron fluoride. In the preparation of these polymers, we may employ, for example, liquid isobutylene or a hydrocarbon mixture containing isobutylene, butane, and butylene, recovered from petroleum gases, especially those gases produced in the cracking of petroleum oils in the manufacture of gasoline. This light fraction may contain from about 10% to about 25% isobutylene, the remainder being principally butanes and normal butylene.

The preparation of polymers having molecular weights ranging from about 150 to about 2000 from the butane-butylene-isobutylene fraction may be carried out as follows: The hydrocarbon mixture containing 10% to 25% isobutylene is maintained under pressure sufficient to keep it in the liquid phase and cooled to a temperature of, for example, from about 0° F. to about 100° F., and preferably from about 0° F. to about 32° F., and from about 0.1% to about 2% boron fluoride, based upon the isobutylene content of the material treated, is added with vigorous agitation. Excessive rise in the temperature due to the heat of reaction may be avoided by efficient cooling. After the polymerization of the isobutylene together with a relatively minor amount of the normal olefins present, the reaction mass is neutralized, washed free of acidic substances arising from the catalyst, the oily layer separated, and the polymer subsequently separated from the unreacted hydrocarbons by distillation. The polymer mixture so obtained, depending upon the temperature reaction varies in consistency from a light liquid to a viscous oily material and contains polymers having molecular weights ranging from about 100 to 2000 or more. The polymers so obtained may be treated with a phosphorus sulfide or the polymer may be fractionated under reduced pressure into fractions of increasing molecular weights, for example, a tetramer fraction having a boiling point range between 470° F. and 475° F. and, for example, a distillate having a Saybolt viscosity at 100° F. of about 150 seconds to about 200 seconds, or other desired fractions, and the fractions employed to obtain the desired addition agents. The bottoms resulting from the distillation of the polymer are also well suited for the purpose of the present invention. Bottoms having Saybolt Universal viscosities at 210° F. of from about 50 seconds to about 10,000 seconds, and preferably above about 80 seconds, may be employed.

Another source of an olefinic polymer suitable for the herein intended purpose is a fraction of the polymer obtained in the treatment of a gaseous hydrocarbon mixture containing isobutylene and normal butylene in the presence of a phosphoric acid catalyst in the synthesis of iso-octane. The polymer may be obtained by subjecting a gas mixture comprising less than $C_6$ hydrocarbons and containing $C_4$ olefins and paraffins to temperatures of about 270° F. to about 430° F., preferably from about 300° F. to about 330° F., and at a pressure of from about 500 pounds per square inch to about 750 pounds per square inch and preferably about 600 pounds per square inch in the presence of a catalyst such as phosphoric acid on kieselguhr, diatomaceous earth or the like. The mixed polymer obtained comprises essentially a dimer, but contains in addition about 5–10% and usually 6–7% of heavy polymer comprising trimer, tetramer and still higher polymers. This heavy polymer fraction may be separated and treated or it may be still further fractionated to give about 10–15% bottoms, which comprises essentially a tetramer fraction boiling between about 400° F. and about 520° F.

The olefin hydrocarbons which can be employed in the preparation of the products of the present invention are preferably olefinic hydrocarbons having at least about 12, preferably at least 20, carbon atoms per molecule such as cetene ($C_{16}$), cerotene ($C_{26}$), and melene ($C_{30}$), and mixed high molecular weight alkenes obtained by cracking of petroleum oils, paraffin waxes, etc. Other preferred olefins we can employ in the preparation of the hereindescribed phosphorus sulfide reaction products are olefins having at least 20 carbon atoms in the molecule of which from at least about 12 carbon atoms and preferably at least about 15 carbon atoms are in a straight chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

The olefins obtained by the dehalogenation of long chain alkyl halides, are preferably obtained by the dehalogenation of halogenated waxes such as, for example, those obtained by the dechlorination of chlor-paraffin wax. The alkyl halides are decomposed to yield olefins according to the reaction $$C_nH_{2n+1}X \rightarrow C_nH_{2n} + HX$$

in which $n$ is at least 12 and preferably at least 20 and X is an halogen. I prefer to employ paraffin waxes which have at least about 20 carbon atoms per molecule and which melt upwards from about 90° F. and preferably within the range of from about 120° F. to about 140° F.

To obtain the halogenated paraffin wax, for example, chlorinated paraffin wax, I introduce chlorine into the wax, maintained in a molten state, until the wax has a chlorine content of from about 8% to about 15%. The chlorinated wax product is a mixture of unchlorinated wax, monochlor wax and polychlor wax. The monochlor wax fraction can be segregated from the unchlorinated wax and the polychlor wax fractions by taking advantage of the differences in the melting points of the various fractions, since the melting point of the wax varies with the extent of chlorination, i. e., the melting point of the unchlorinated wax being greater than that of the monochlor wax, and the melting point of the latter being greater than that of the polychlor wax. Thus, the monochlor paraffin wax can be separated from the unchlorinated and the polychlor wax fractions by means such as sweating, fractional crystallization, solvent extraction, solvent precipitation, and fractional distillation.

The high molecular weight olefins are obtained by removing the halogen as hydrogen chloride from the halogenated paraffin wax, for example, the corresponding olefin is obtained from the monochlor paraffin wax by removing the chlorine from the latter as hydrogen chloride. The monochlor wax can be dechlorinated by heating to a temperature of from about 200° F. to about 500° F. in the presence of a dechlorinating agent such as an alkali metal hydroxide or an alkaline earth metal hydroxide or oxide. Other alkaline inorganic or organic materials can also be used. The chlorine can also be removed from the chlor-wax by heating the same for a prolonged period in the absence of any dechlorinating agent. After the dehalogenation has been completed the olefin so obtained can be further purified by removing the dehalogenating agent by means of filtration or by other suitable means.

The phosphorus sulfide-olefin or olefin polymer reaction product may be obtained by reacting a phosphorus sulfide such as $P_2S_3$, $P_2S_5$, $P_4S_7$, $P_4S_3$, etc., preferably $P_2S_5$, with an olefin or olefin polymer of the type hereindescribed at a temperature of from about 200° F. to about 500° F., and preferably from about 300° F. to about 400° F. It is advantageous to maintain a non-oxidizing atmosphere, such as, for example, an atmosphere of nitrogen, above the reaction mixture. From about 1% to about 50%, and preferably from about 5% to about 25% of the phosphorus sulfide may be used. Usually it is preferable to use an amount of phosphorus sulfide that will completely react with the polymer, for example, 10%, so that no purification is necessary. However, excess phosphorus sulfide may be used and separated from the product after the reaction is completed, by filtering or by diluting with a solvent such as hexane, filtering, and distilling off the solvent. The reaction mixture may be further treated by blowing with steam or nitrogen at an elevated temperature to improve the odor thereof.

As aforesaid, the above-described phosphorus sulfide-olefin or olefin polymer reaction product is then neutralized with a suitable alkali such as a hydroxide, an oxide, or a carbonate of an alkali or of an alkaline earth metal or with ammonia, and preferably with sodium or potassium hydroxide. This neutralization may be carried out by contacting the phosphorus sulfide-olefin or olefin polymer reaction product, either as such or dissolved in a suitable solvent, such as naphtha, with a solution of the neutralizating agent, for example, potassium hydroxide dissolved in alcohol. The neutralization may also be accomplished by adding the dry neutralizing agent, such as KOH, NaOH, $Na_2CO_3$, $KHCO_3$, CaO, or dry ammonia to the phosphorus sulfide-olefin or olefin polymer reaction product, preferably at an elevated temperature of from about 100° F. to about 400° F., preferably in a non-oxidizing atmosphere.

The neutralized product may be further treated with a salt of a heavy metal to obtain a heavy metal derivative thereof.

*Example I*

A polymer obtained by treating a hydrocarbon mixture containing about 10% to about 25% isobutylene with boron fluoride at a temperature of about 32° F. was distilled to a bottoms having a Saybolt Universal viscosity at 210° F. of about 3000 seconds. These bottoms were then reacted with about 10% phosphorus pentasulfide at a temperature of 370° F. to 390° F. for about five hours, and then blown with nitrogen for about five hours within this temperature range. This reaction product had a sulfur content of about 6% and a phosphorus content of about 3%.

A portion of this reaction product was then diluted with about 5 volumes of hexane and thoroughly agitated with about 3 volumes of 5% KOH in 70% alcohol. The hexane layer was separated and the hexane removed by distillation.

*Example II*

Another portion of the above $P_2S_5$ polymer reaction product of Example I was neutralized in the following manner. To 300 grams of the reaction product, 9 grams of dry KOH were added at a temperature of 200° F. The temperature was then increased to about 340° F., maintained at about 340° F.–350° F. for five hours, and then heated within this range for eighteen more hours while bubbling nitrogen through the mixture. The final product had an acidity of 10.5 mg. KOH per gram of product.

*Example III*

An olefin hydrocarbon having a long straight chain was obtained by chlorinating paraffin wax having a melting point of about 130–132° F. by maintaining the wax at a temperature within the range of 180–200° F. and bubbling chlorine through the molten wax until the chlorine content of the wax was about 14% by weight. The chlorinated paraffin wax was then dechlorinated by heating the same at a temperature of 560° F. for five hours in the presence of 100% excess calcium oxide.

The dechlorinated paraffin wax was then heated with 10% phosphorus pentasulfide at a temperature within the range of 380° F. to 400° F. for four hours. The reaction product was then neutralized by heating the same at a temperature of 400° F. for two hours and adding 5% potassium hydroxide in a 50% aqueous solution. The neutralized product was then diluted with hexane, settled, and filtered to remove solid impurities from the product. The hexane was then removed by distillation.

The materials prepared in accordance with the present invention can be employed for a large variety of uses in which wetting, penetrating, detergent, emulsifying and other interface modifying functions are required. Illustrative of some of the many purposes for which these materials can be used are: as antirust agents in automobile radiators, for dispersing pigments and the like in liquid vehicles, as a penetrating agent in leather dressings, as a penetrating and/or emulsifying agent in cosmetics, as a fat splitting agent, and as wetting and/or emulsifying agents in combination with mineral oils or fatty oils, for slushing oils, soluble oils, cutting oils, textile lubricants, drawing lubricants and many others.

Corrosion in heat-exchange devices, such as, for example, automobile radiators, can be inhibited by adding small amounts, for example, from about 0.5% to about 5% of the products of the present invention to the heat-exchange medium, such as water or aqueous mixtures containing freezing point depressants such as ethanol, methanol, glycerol, ethylene glycol, etc. The heat exchange medium may also contain an emulsifying agent and as a salt of sulfonic acids obtained in the sulfuric acid treatment of mineral oils.

Compositions useful as textile lubricants may comprise from about 50% to about 90% of a highly refined low viscosity mineral oil, having a viscosity of about 60–90 seconds Saybolt Universal at 100° F. from about 1% to about 20% of fatty acid, such as oleic acid, from about 0.5% to about 40% of an alkali metal soap of the sulfonic acids derived by the treatment of mineral oils with sulfuric acid and from about 0.5% to about 10% of a phosphorus sulfide reaction product of the present invention.

Soluble oils suitable for use in metal working operations may contain from about 60% to about 85% lubricating oil, 0.5% to about 10% of a reaction product of the present invention, from about 10% to about 30% of a petroleum sulfonic acid soap. Other constituents such as water, alcohol, oleic acid, bacteria controlling agents, etc., can be included.

Compositions, otherwise known as slushing compounds, adapted to be applied to metal surfaces to prevent or inhibit rusting and/or corrosion, containing from about 0.5% to about 10% of a product of the present invention, and mineral oil are very effective. These slushing compounds may contain in addition to petrolatum, a soap of preferentially oil-soluble petroleum sulfonic acid wax, and/or other derived ingredients.

It is to be understood that the foregoing description and examples are intended to be illustrative only and not a limitation of the scope of the invention. Any modifications or variation therefrom which conforms to the spirit of the invention is intended to be included within the scope of the claims.

I claim:

1. An aqueous liquid composition containing from about 0.5% to about 10% of the phosphorus and sulfur-containing product obtained by reacting a phosphorus sulfide and an olefin, and neutralizing the resulting reaction product.

2. An aqueous liquid composition containing from about 0.5% to about 10% of the phosphorus and sulfur-containing product obtained by reacting a phosphorus sulfide and an olefin polymer, and neutralizing the resulting reaction product.

3. An aqueous liquid composition containing from about 0.5% to about 10% of the phosphorus and sulfur-containing product obtained by reacting a phosphorus sulfide and an olefin, and neutralizing the resulting reaction product with a basic reagent having a metal constituent.

4. An aqueous liquid composition as described in claim 3 in which the basic reagent is sodium hydroxide.

5. An aqueous liquid composition as described in claim 3 in which the basic reagent is potassium hydroxide.

6. An aqueous liquid composition containing from about 0.5% to about 10% of a reaction product of a phosphorus sulfide and a long chain olefin hydrocarbon, and neutralizing the resultant reaction product with a basic reagent having a metal constituent, said neutralized reaction product containing sulfur, phosphorus and the metal constituent of said basic reagent.

7. An aqueous liquid composition as described in claim 6 in which the long chain olefin hydrocarbon is one having at least about 20 carbon atoms in the molecule of which at least about 12 carbon atoms are in a straight chain.

8. An aqueous liquid composition as described in claim 6 in which the long chain olefin hydrocarbon is one having at least about 20 carbon atoms in the molecule obtained by the dehalogenation of an alkyl halide having at least about 20 carbon atoms in the molecule.

9. An aqueous liquid composition containing from about 0.5% to about 10% of the phosphorus and sulfur-containing product obtained by the process comprising reacting a phosphorus pentasulfide with an isobutylene polymer and neutralizing the resulting reaction product with a basic reagent selected from the group consisting of an oxide, an hydroxide and a carbonate of a metal of the alkali metal group and ammonia.

10. The method of modifying the interface of a system of which at least one component is an aqueous liquid comprising introducing into said system from about 0.5% to about 10% of the phosphorus and sulfur-containing product obtained by reacting a phosphorus sulfide and an olefin and neutralizing the resulting reaction product.

11. The method of modifying the interface of a system of which at least one component is an aqueous liquid comprising introducing into said system from about 0.5% to about 10% of the phosphorus and sulfur-containing product obtained by reacting a phosphorus sulfide and an olefin polymer and neutralizing the resulting reaction product.

12. The method of modifying the interface of a system of which at least one component is an aqueous liquid comprising introducing into said system from about 0.5% to about 10% of the phosphorus, sulfur and metal-containing product obtained by the process comprising reacting a phosphorus sulfide and an olefin and neutralizing the resultant reaction product with a basic reagent having a metal constituent.

13. The method as described in claim 12 in which the metal is sodium.

14. The method as described in claim 12 in which the metal is potassium.

LAWSON W. MIXON.